(12) United States Patent
Rogers et al.

(10) Patent No.: US 8,842,526 B2
(45) Date of Patent: Sep. 23, 2014

(54) ERROR RECOVERY

(75) Inventors: Tim Rogers, Saffron Walden (GB); Fabrice Nabet, Nice (FR); Olivier Jean, Mouans-Sartoux (FR)

(73) Assignee: Nvidia Corporation, Santa Clara, CA (US)

( * ) Notice: Subject to any disclaimer, the term of this patent is extended or adjusted under 35 U.S.C. 154(b) by 149 days.

(21) Appl. No.: 13/605,272

(22) Filed: Sep. 6, 2012

(65) Prior Publication Data

US 2014/0064065 A1    Mar. 6, 2014

(30) Foreign Application Priority Data

Sep. 5, 2012  (GB) .................................. 1215850.7

(51) Int. Cl.
*H04L 1/00* (2006.01)
*H04L 12/26* (2006.01)

(52) U.S. Cl.
USPC .......................................... 370/228; 370/218

(58) Field of Classification Search
CPC ............................... H04L 45/28; H04L 45/22
USPC ................... 370/217, 218, 225, 228
See application file for complete search history.

(56) References Cited

U.S. PATENT DOCUMENTS

| 7,584,472 | B1 * | 9/2009 | McCormick et al. | ......... 718/100 |
| 7,813,348 | B1 | 10/2010 | Gupta et al. | |
| 2012/0002538 | A1 * | 1/2012 | Chen et al. | ..................... 370/225 |

FOREIGN PATENT DOCUMENTS

| FR | WO 2011/124314 | * 10/2011 | ............ H04W 76/04 |
| WO | 2010119479 A1 | 10/2010 | |

OTHER PUBLICATIONS

"3rd Generation Partnership Project; Technical Specification Group Radio Access Network; Radio Link Control (RLC) protocol specification (Release 11)," 3GPP TS 25.322, V11.0.0, Sep. 2012, 90 pages.
"3rd Generation Partnership Project; Technical Specification Group Radio Access Network; Radio Resource Control (RRC); Protocol specification (Release 11)," 3GPP TS 25.331, V11.3.0, Sep. 2012, 1,981 pages.
"3rd Generation Partnership Project; Technical Specification Group Services and System Aspects; 3G Security; Security architecture (Release 11)," 3GPP TS 33.102, V11.4.0, Sep. 2012, 76 pages.
"3rd Generation Partnership Project; Technical Specification Group Radio Access Network; Physical layer; Measurements (FDD) (Release 11)," 3GPP TS 25.215, V11.0.0, Dec. 2011, 24 pages.
GB Combined Search and Examination Report, Application No. GB1215850.7, dated Dec. 24, 2012, 5 pages.

* cited by examiner

*Primary Examiner* — Ronald Abelson

(57) ABSTRACT

A method for handling error recovery at a user equipment is provided herein. In one embodiment, the method includes: maintaining first and second communication channels between the user equipment and a radio access network; storing a plurality of control messages in a buffer for transmission over the first communication channel; detecting if the first communication channel is disabled; initiating a recovery procedure using the second communication channel that includes restoring the first communication channel using the second communication channel and sending a further message to one of the one or more buffers for transmission on the restored first communication channel; and in response to detecting that the first communication channel is disabled, moderating control messages stored in the one or more buffers.

29 Claims, 6 Drawing Sheets

ERROR RECOVERY

CROSS REFERENCE TO RELATED APPLICATION

This application claims priority from GB Application No. 1215850.7 filed on Sep. 5, 2012, by Tim Rogers et al., which is currently pending and is incorporated herein by reference.

TECHNICAL FIELD

This disclosure relates to handling error recovery at a user equipment.

BACKGROUND

In a communication system, a device (typically a mobile device) termed user equipment (UE) communicates wirelessly with a radio access network. Communications between the UE and the radio access network are effected in accordance with a multi-layered communications protocol.

A radio resource control layer of the multi-layered communications protocol generates radio resource control (RRC) messages. Typically, in the uplink measurement reports form the majority of messages. Measurement reports are used to communicate the radio environment of the UE that the UE has measured, to the radio access network. The radio resource control layer transmits these radio resource control messages to a radio link control layer. The radio resource control messages are stored in one or more buffers of the radio link control layer.

When a user equipment (UE) suffers from a bad radio conditions it is necessary for the user equipment to implement an error recovery procedure.

When the radio link conditions are impaired, it is common for the DCCH to be disabled and a number of radio resource control messages to be buffered in the radio link control layer. If the radio link conditions remain impaired, the radio resource control layer performs error recovery procedures, which will be delayed by these buffered radio resource control messages.

SUMMARY

According to a first aspect, the disclosure provides a method for handling error recovery at a user equipment. In one embodiment, the method includes: maintaining a first communication channel and a second communication channel between the user equipment and a radio access network; storing a plurality of control messages in one or more buffers for transmission over the first communication channel; detecting if the first communication channel is disabled; initiating a recovery procedure using the second communication channel, wherein the recovery procedure comprises restoring the first communication channel using the second communication channel; sending a further message to one of the one or more buffers for transmission on the restored first communication channel as part of said procedure; and in response to detecting that the first communication channel is disabled, moderating control messages stored in the one or more buffers by one or both of: selecting a subset of un-transmitted control messages from a plurality of un-transmitted control messages in the one or more buffers, and discarding said subset of un-transmitted control messages from the one or more buffers; and restricting the supply of control messages to the one or more buffers.

According to a second aspect, the disclosure provides a user equipment. In one embodiment, the user equipment includes: a central processing unit; a memory coupled to the central processing unit, the memory containing program code executable by the central processing unit causing the central processing unit to perform the following steps: maintaining a first communication channel and a second communication channel between the user equipment and a radio access network; storing a plurality of control messages in one or more buffers for transmission over the first communication channel; detecting if the first communication channel is disabled; initiating a recovery procedure using the second communication channel, wherein the recovery procedure comprises restoring the first communication channel using the second communication channel; sending a further message to one of the one or more buffers for transmission on the restored first communication channel as part of said procedure; and in response to detecting that the first communication channel is disabled, moderating control messages stored in the one or more buffers by one or both of: selecting a subset of un-transmitted control messages from a plurality of un-transmitted control messages in the one or more buffers, and discarding said subset of un-transmitted control messages from the one or more buffers; and restricting the supply of control messages to the one or more buffers.

According to a third aspect, the disclosure provides a computer program product for handling error recovery at a user equipment. In one embodiment, the computer program product comprising code embodied on a non-transient computer-readable medium and configured so as when executed on a processing apparatus of the user equipment to perform operations according to the method described in the first aspect.

BRIEF DESCRIPTION OF THE DRAWINGS

For a better understanding of the disclosure and to show how the same may be put into effect, reference will now be made, by way of example, to the following drawings in which.

DETAILED DESCRIPTION

Figure 1:
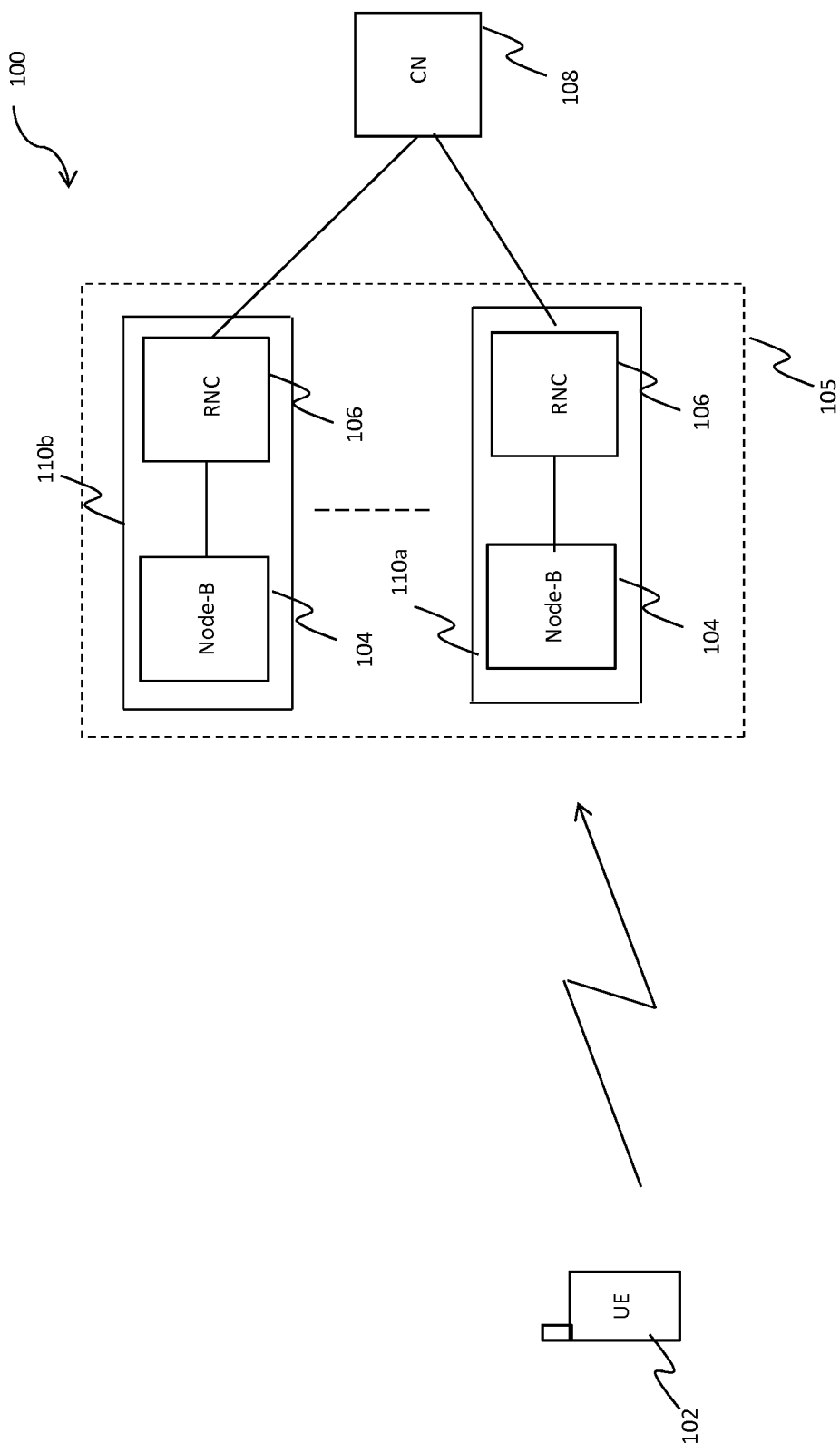
FIG. 1 shows a UMTS mobile communication system.

When a first communication channel between user equipment and a radio access network is disabled, the user equipment uses a second communication channel between the user equipment and radio access network to initiate an error recovery procedure. This error recovery procedure comprises restoring the first communication channel using the second communication channel. As part of the error recovery procedure, a further message is sent from the user equipment to the radio access network on the restored first communication channel. However the transmission of this message cannot be transmitted until other control messages have been transmitted from one or more buffers of the radio link control layer. This can cause delay, e.g. the delay can be such that the radio access network times-out and finds the error recovery procedure has failed. The disclosure recognizes that moderation of control messages in the one or more buffers of the radio link control layer can reduce this delay to improve a user's experience at the user equipment.

As noted above the disclosure provides a method for handling error recovery at a user equipment. In one embodiment the method includes: maintaining a first communication channel and a second communication channel between the user equipment and a radio access network; storing a plurality of control messages in one or more buffers for transmission over the first communication channel; detecting if the first communication channel is disabled; initiating a recovery procedure using the second communication channel, wherein the recovery procedure comprises restoring the first communication channel using the second communication channel; sending a further message to one of the one or more buffers for transmission on the restored first communication channel as part of said procedure; and in response to detecting that the first communication channel is disabled, moderating control messages stored in the one or more buffers by one or both of: selecting a subset of un-transmitted control messages from a plurality of un-transmitted control messages in the one or more buffers, and discarding said subset of un-transmitted control messages from the one or more buffers; and restricting the supply of control messages to the one or more buffers.

The subset may comprise one or more measurement report messages, each of the one or more measurement report messages comprising a measurement of the user equipment's radio environment.

The measurement report messages may include one or more of the following types: an intra-frequency cell measurement; an inter-frequency cell measurement; an inter-radio access technology cell measurement; a traffic volume measurement; a quality measurement; and a user equipment internal measurement. The measurement of the user equipment's radio environment may be one or more of the following quantities: a received signal power; a received signal strength; a transmitted signal power; a transmitted signal strength; and a timing difference between data elements communicated between the user equipment and the radio access network The at least one of the one or more measurement report messages may be generated periodically for transmission to the radio access network. Alternatively, the at least one of the one or more measurement report messages may be event based, whereby the measurement report message is generated for transmission to the radio access network when the measurement exceeds or falls below a predetermined level.

The method may further comprise filtering said subset of un-transmitted control messages based on type of measurement report message and discarding the filtered subset of un-transmitted control messages from the one or more buffers. In one embodiment, the filtering prevents measurement report messages comprising a traffic volume measurement from being discarded.

The method may further comprise modifying a sequence number included in an un transmitted control message remaining in the one or more buffers responsive to said step of discarding such that the sequence number is consistent with a sequence number included in the last control message to be transmitted on the first communication channel prior to the first communication channel being disabled. In one embodiment, the sequence number is a radio resource control sequence number (RRC-SN).

The step of discarding may be implemented upon initiating the recovery procedure. Alternatively, the step of discarding may be implemented during the recovery procedure.

In one embodiment, un-transmitted Non-Access Stratum messages are not discarded from the one or more buffers.

The step of restricting the supply of control messages may comprise restricting all control messages such that no control messages are supplied to the one or more buffers.

The step of restricting the supply of control messages may comprise restricting the supply of a subset of control messages to the one or more buffers. The subset may comprise one or more measurement report messages, each of the one or more measurement report messages comprising a measurement of the user equipment's radio environment.

The measurement report messages may include one or more of the following types: an intra-frequency cell measurement; an inter-frequency cell measurement; an inter-radio access technology cell measurement; a traffic volume measurement; a quality measurement; and a user equipment internal measurement. The measurement of the user equipment's radio environment may be one or more of the following quantities: a received signal power; a received signal strength; a transmitted signal power; a transmitted signal strength; a timing difference between data elements communicated between the user equipment and the radio access network.

At least one of the one or more measurement report messages may be generated periodically for transmission to the radio access network.

In one embodiment, a predetermined number of periodic measurement reports are permitted to be supplied to the one or more buffers, and any additional periodic measurement reports are restricted from being supplied to the one or more buffers.

At least one of the one or more measurement report messages may be event based, whereby the measurement report message is generated for transmission to the radio access network when the measurement exceeds or falls below a predetermined level.

The method may further comprise filtering said subset of control messages based on type of measurement report message and restricting the supply of the filtered subset of control messages to the one or more buffers. The filtering may prevent measurement report messages comprising a traffic volume measurement from being restricted.

In one embodiment, un-transmitted Non-Access Stratum messages are not restricted from being supplied to the one or more buffers.

In one embodiment, the user equipment communicates with the radio access network in accordance with a multi-layered communication protocol, wherein the one or more buffers are in a radio link control layer and the control messages are supplied from a radio resource control layer to the one or more buffers in the radio link control layer.

In one embodiment, the first communication channel is a dedicated control channel and the second communication channel is a common control channel. The control messages are radio resource control messages in some embodiments.

In response to detecting that the first communication channel is disabled, the method may comprise moderating control messages stored in the one or more buffers by selecting a subset of un-transmitted control messages from a plurality of un-transmitted control messages in the one or more buffers, and discarding said subset of un-transmitted control messages from the one or more buffers.

In response to detecting that the first communication channel is disabled, the method may comprise moderating control messages stored in the one or more buffers by restricting the supply of control messages to the one or more buffers.

Embodiments of the disclosure will now be described by way of example only.

With reference to FIG. 1, there is illustrated the main elements of a UMTS communication system, generally denoted by reference numeral 100. It will be understood that in FIG. 1 sufficient elements of the system are shown in order to present the context of arrangements of the disclosure.

The UMTS communication system 100 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 110a,110b. A radio network sub-system is a sub-network within the UTRAN 105 and comprises a base station 104 (termed node-B) and a radio network controller (RNC) 106. A node-B 104 is a transceiver which sends and receives wireless signals and defines a cell region. A RNC 106 is the network element responsible for the control of the radio resources of the UTRAN 105. A dedicated physical channel is established between the UE 102 and the node-B 104 to allow data communication to take place there between. It will be appreciated that a plurality of UEs and radio network sub-systems may be present in the UTRAN 105, which for clarity purposes are not shown. The UTRAN 105 is in communication with a core network 108. The structure of a UMTS mobile communication system as illustrated in FIG. 1 is well-known to one skilled in the art, and the further operation of such a system is not described herein.

Figure 2:
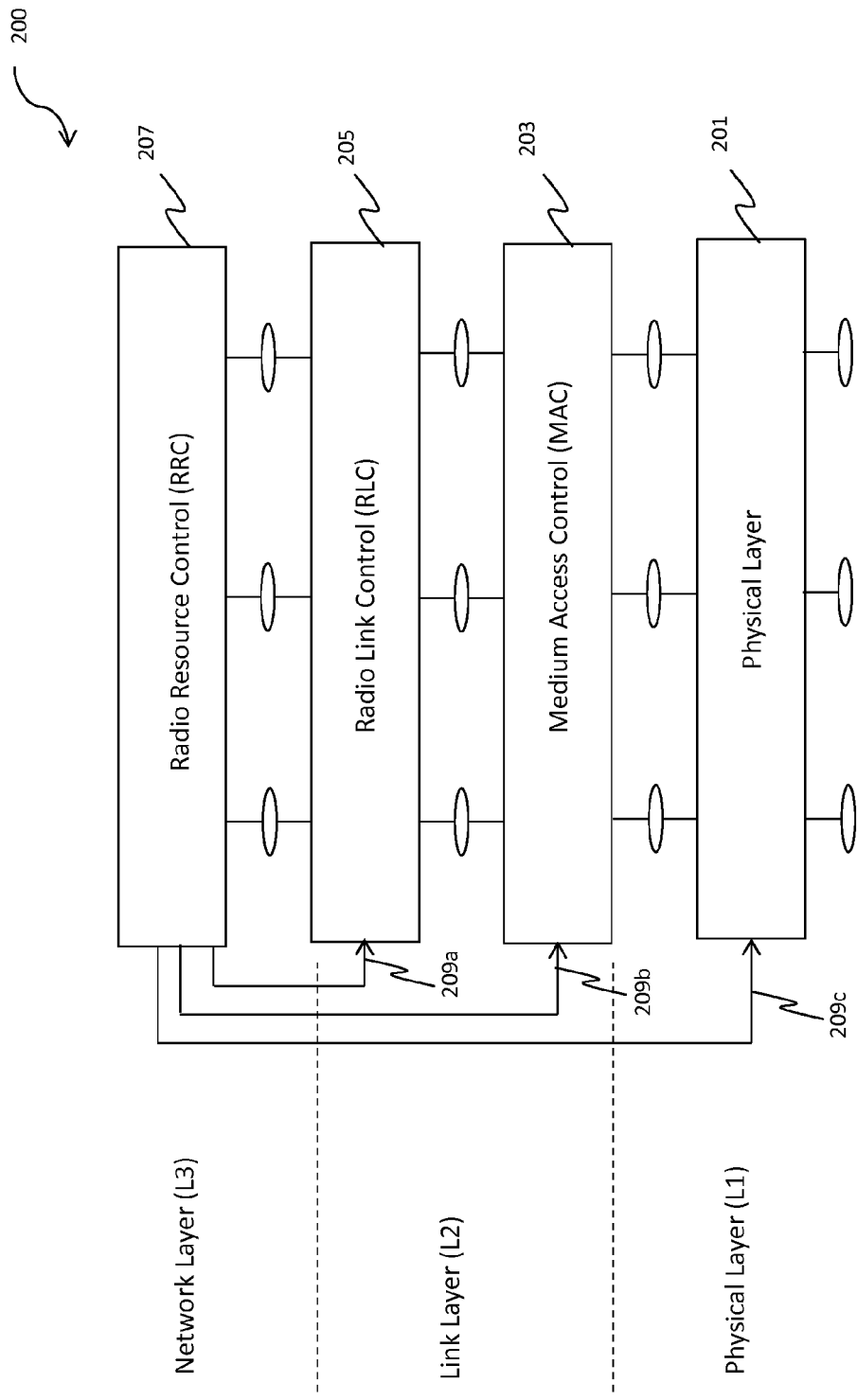
FIG. 2 shows a block diagram of a UMTS radio interface protocol architecture.

Referring to FIG. 2, there is shown a simplified block diagram of a UMTS radio interface protocol architecture 200. Communications between the UE 102 and the UTRAN 105 are effected in accordance with the multi-layered communications protocol shown in FIG. 2. The protocol architecture comprises a first layer (L1) which includes a physical layer 201, above the first layer is a second layer (L2) which includes a Medium Access Control (MAC) layer 203 and a Radio Link Control (RLC) layer 205, and above the second layer is a third layer (L3) which includes a Radio Resource Control (RRC) layer 207.

When data is transmitted from the UE 102 to the UTRAN 105, data is passed from the RLC layer 205 to the MAC layer 203 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 203 the logical channels are mapped to transport channels. In the physical layer 201 the transport channels are mapped onto physical channels. Thus with reference to FIG. 2, it can be seen that during a data transmission from the UE 102 to the UTRAN 105 data is passed down through the layer architecture 200. Similarly, when data is received at the UE 102 from the UTRAN 105, data is passed up through the layer architecture 200.

Control interfaces 209 between the RRC layer 207 and all the lower layer protocols are used by the RRC layer 207 to configure characteristics of the lower layer protocol entities, including parameters for the physical, transport and logical channels. The control interfaces 209 are used by the RRC layer 207 to command the lower layers to perform certain types of measurement and by the lower layers to report measurement results and errors to the RRC layer 207.

The RLC layer 205 provides services to higher layers for the transfer of user and/or control data. The service provided for user data is called Radio Bearer (RB) and the service provided for control data is called Signalling Radio Bearer (SRB). A SRB is associated with a signalling radio bearer queue and a logical channel. The RLC layer 205 may comprise multiple SRB's such that each SRB is associated with a signalling radio bearer queue and a logical channel.

During communications between the UE 102 and the UTRAN 105, the RRC layer 207 uses the measurement results received from the lower layers to generate one or more RRC messages. The RRC layer 207 transmits these RRC messages to the RLC layer 205. The RRC messages are stored in signalling radio bearer queues (sometimes referred to as "buffers") of the RLC layer 205 for transmission on the DCCH to the UTRAN 105.

However, the communications between the UE 102 and the UTRAN 105 can be disrupted during bad radio conditions such that the DCCH is disabled. Whilst bad radio conditions is one example cause of the DCCH being disabled, those skilled in the art will appreciate that other conditions such as ciphering mismatches would lead to other protocol errors which may cause the DCCH to be disabled.

One example wherein the communications between the UE 102 and the UTRAN 105 are disrupted is the radio link failure scenario in UTRAN. A radio link failure is a connection failure that occurs in the physical layer 201. Another example wherein the communications between the UE 102 and the UTRAN are disrupted is the RLC unrecoverable error scenario in UTRAN. An RLC error occurs in the RLC layer 205. In both of these scenarios, the DCCH becomes disabled.

At the point in time when the DCCH is disabled the signalling radio bearer queues may comprise RRC messages at different stages of transmission. For example, the signalling radio bearer queues may comprise RRC messages that have been transmitted to the UTRAN 105, and are being held in the queues awaiting acknowledgement from the UTRAN 105 that the transmitted messages were safely received by the UTRAN 105. At the point in time when the DCCH is disabled, the signalling radio bearer queues may also comprise RRC messages that have been partially transmitted to the UTRAN 105. At the point in time when the DCCH is disabled, the signalling radio bearer queues may also comprise RRC messages yet to be transmitted to the UTRAN 105.

A procedure for recovery from radio link failure or an RLC unrecoverable error is now described with reference to FIGS. 3 and 4.

Figure 3:
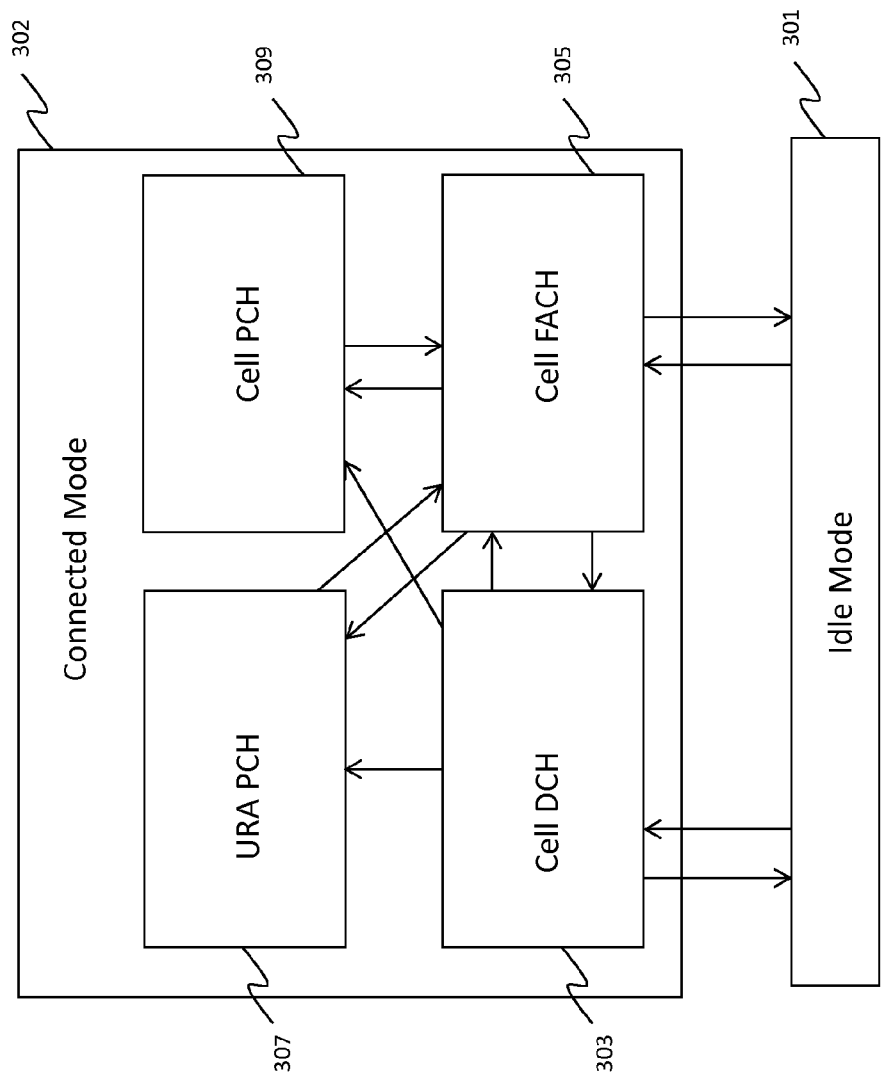
FIG. 3 is a state diagram of the radio resource control (RRC) layer.

FIG. 3 is a state diagram of the RRC layer 207. Two basic operational modes of a UE 102 are idle mode 301 and connected mode 302. If there is a logical connection between the UE 102 and the UTRAN 105, then the UE 102 is said to be in the connected mode 302. The connected mode can be further divided into service states, which define the kind of physical channels a UE 102 is using. FIG. 3 shows the main RRC service states in the connected mode, these include the CELL DCH state 303, the CELL FACH state 305, the URA PCH state 307, and the CELL PCH state 309. FIG. 3 also shows the transitions between the idle mode 301 and the connected mode 302, and the possible transitions within the connected mode.

The CELL DCH state 303 is characterised in that a dedicated physical channel is allocated to the UE 102 for uplink (UE 102 to the UTRAN 105) and downlink (UTRAN 105 to the UE 102). In this state the UE 102 performs measurements and sends measurement reports using the DCCH to the UTRAN 105.

Following the DCCH being disabled (caused by for example radio link failure or an RLC unrecoverable error) the UE 102 moves to the CELL FACH state 305. The CELL FACH state 305 is characterised in that no dedicated physical channel is allocated to the UE 102, only common control channels (CCCH) are available for uplink.

Once in CELL FACH state 305 the UE 102 transmits a CELL UPDATE 402 (shown in FIG. 4) towards the UTRAN 105 on CCCH. The UTRAN 105 responds with a CELL UPDATE CONFIRM 404, which restores the DCCH. The CELL UPDATE CONFIRM 404 includes a re-establishment indication. If this is set to "TRUE", the DCCH radio bearers are re-established, otherwise a re-establishment must not be performed. The UE 102 must transmit a response to the CELL UPDATE CONFIRM 404, for example a UTRAN MOBILITY INFORMATION CONFIRM 406, to the UTRAN 105 on DCCH.

The $3^{rd}$ Generation Partnership Project (3GPP) specification 3GPP TS 25.322 "Radio Link Control (RLC); Protocol specification" section 9.7.7 describes re-establishment procedures in which any transmitted or partially transmitted RRC messages are discarded from the signalling radio bearer queues.

RRC messages stored in signalling radio bearer queues are transmitted in the order they are queued i.e. signalling radio bearer queues act as first-in first-out (FIFO) queues. As part of the recovery shown in FIG. 4, the UTRAN MOBILITY INFORMATION CONFIRM 406 will be sent to the signalling radio bearer queues of the RLC layer 205 for transmission to the UTRAN 105 on the restored DCCH. However, before the UTRAN MOBILITY INFORMATION CONFIRM 406 can be sent, un-transmitted RRC control messages, queued before the DCCH was disabled, must be transmitted from the signalling radio bearer queues. As a result of the UE 102 being in the CELL FACH state 305, the un-transmitted RRC control messages must be transmitted to the UTRAN 105 using the random access channel (RACH) transport channel. The latency of RACH signalling is much higher than dedicated transport channel (DCH) due to the random access procedures, collisions and contention resolution. The transmission rate on the RACH channel is low (the throughput for the RACH channel is typically less than 10 kbps) due to random access procedures and contention resolution mechanisms.

Thus, the transmission of the UTRAN MOBILITY INFORMATION CONFIRM 406 to the UTRAN 105 on DCCH is delayed. This delay can be such that the UTRAN 105 finds the recovery procedure has failed and releases the DCCH resources.

As recognized herein, reducing the delay to data transmission being restarted, an improvement in the user experience at the UE 102 following a radio link failure or an RLC unrecoverable error can be obtained. The reduction of the delay for data transmission to restart can be achieved by moderating the amount of RRC messages stored in the signalling radio bearer queues.

The moderation of the amount of RRC messages stored in the signalling radio bearer queues will now be described with reference to FIGS. 5 and 6.

Figure 5:
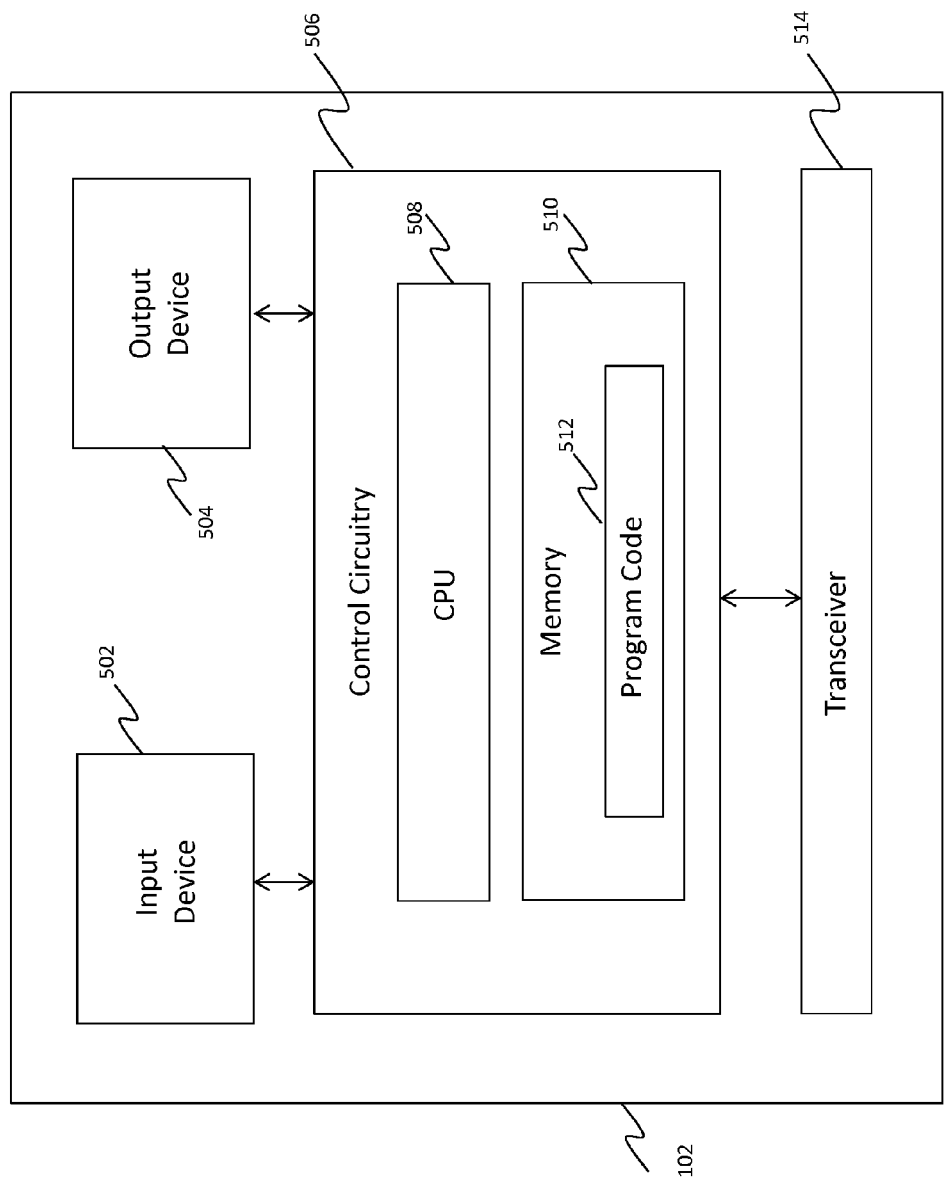
FIG. 5 is a block diagram of a user equipment.

FIG. 5 is a functional block diagram of a UE 102 according to the disclosure. For simplicity, FIG. 5 shows an input device 502, an output device 504, a control circuit 506, a central processing unit (CPU) 508, a memory 510, program code 512, and a transceiver 514 of the UE 102. The UE 102 can receive signals input by a user of the UE 102 through the input device 502, such as a keyboard, and can output images and sounds through the output device 504, such as a display or speakers. The transceiver 514 is used to receive and transmit wireless signals, deliver received signals to the control circuit 506, and output signals generated by the control circuit 506 wirelessly. In the UE 102, the control circuit 506 executes the program code 512 stored in the memory 510 through the CPU 508, thereby controlling an operation of the UE 102. The features of the techniques described below are platform-independent, meaning that the techniques may be implemented on a variety of commercial computing platforms having a variety of processors. The program code 512 can be stored in one or more computer readable memory devices. The memory 510 may be volatile memory such as RAM or non-volatile memory such as flash (EEPROM). The memory 510 may be a component of the UE's circuitry or may be on machine-readable media, examples of which are well known in the art. Referring back to the UMTS radio interface protocol architecture 200 shown in FIG. 2, the transceiver 514 can be seen as a portion of Layer 1, and the control circuit 106 can be utilised to realise functions of Layer 2 and Layer 3.

The CPU 508 executes the program code 512 so as to implement embodiments disclosed herein. The steps are detailed below and illustrated in the flowchart 600 of FIG. 6.

At step S602, the RLC layer 205 receives RRC messages from the RRC layer 207. The process then proceeds to step S604 where the signalling radio bearer queues in the RLC layer 205 store the RRC messages. The process then proceeds to step S606 where a determination is made as to whether the DCCH is disabled due to, for example, a radio link failure or an RLC unrecoverable error. The RRC layer 207 makes this determination based upon an error triggered by the physical layer (L1) or link layer (L2).

The transmission may be disabled due to physical layer or MAC procedures well known to those skilled in the art. For example power limiting in transport format combination (TFC) selection or E-TFC (E-DCH Transport Format Combination) selection, or low Q (quality parameter) value, or no E-DCH serving grant.

If at step S606 it is determined that the DCCH is not disabled, i.e. the DCCH is operational for the transfer of control information between the UE 102 and the UTRAN 105, then the process proceeds to step S608. At step S608, the RRC messages stored in the signalling radio bearer queues in the RLC layer 205 are transmitted on the DCCH from the UE 102 to the UTRAN 105.

Referring back to step S606, if at step S606 it is determined that the DCCH is disabled the process proceeds to step S610. At step S610, a step of moderating control messages stored in the one or more buffers of the RLC layer 205 is implemented.

The step of moderating RRC messages stored in the one or more buffers of the RLC layer 205 may comprise selecting a subset of un-transmitted RRC messages from a plurality of un-transmitted RRC messages stored in the signalling radio bearer queues in the RLC layer 205 prior to the DCCH being disabled, and discarding the selected subset of un-transmitted RRC messages from the signalling radio bearer queues in the RLC layer 205. The un-transmitted RRC messages not in the selected subset are not discarded from the signalling radio bearer queues in the RLC layer 205.

Figure 6:
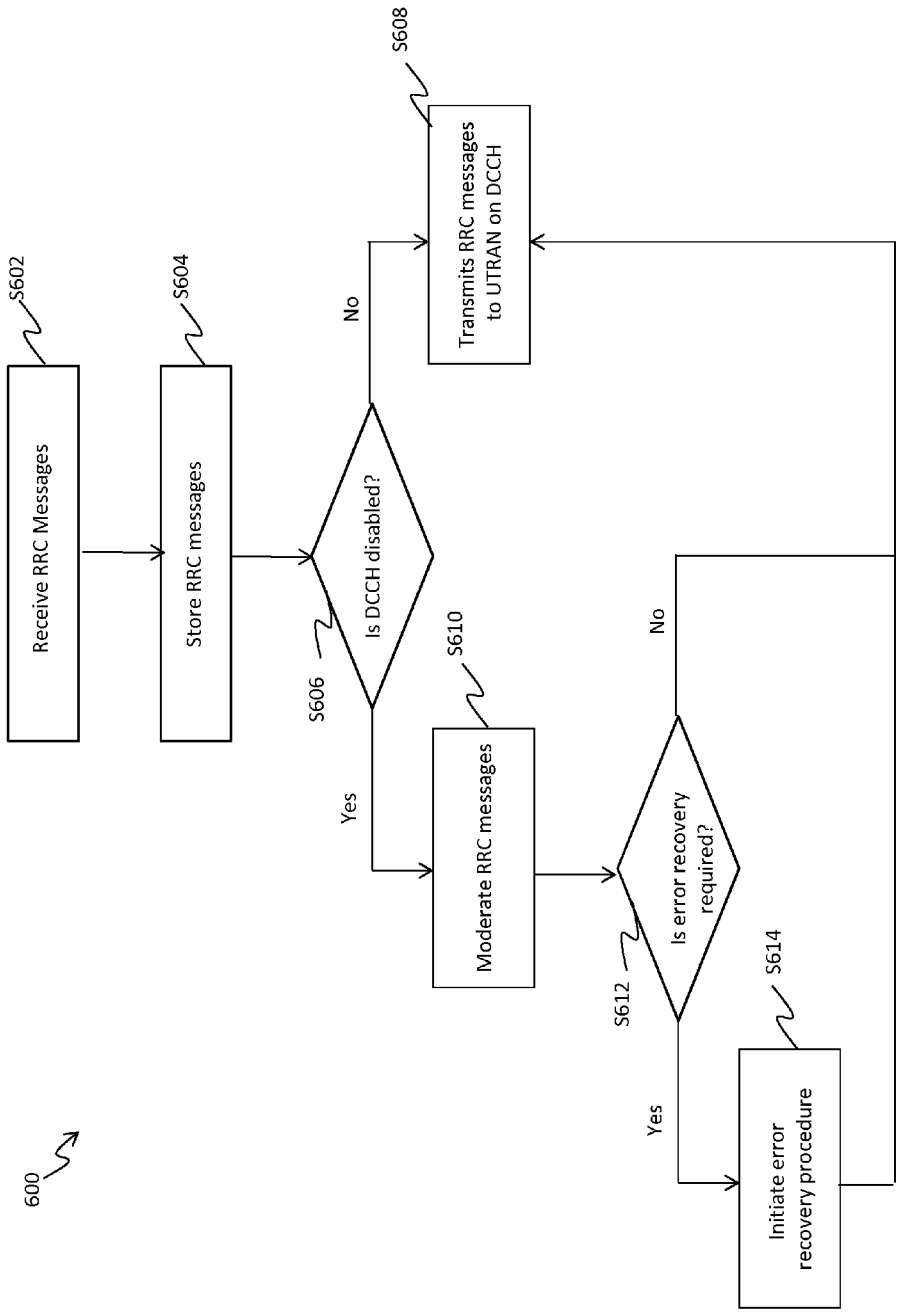
FIG. 6 is a flowchart of a process for moderating control messages stored in a radio link control (RLC) layer.

The discard may be implemented when the radio link failure or an RLC unrecoverable error is detected (as shown in FIG. 6). Alternatively, the discard may be implemented during a procedure to re-enable the DCCH i.e. in the time between radio link failure or RLC unrecoverable error being detected and the DCCH being restored. The discard must be completed before the DCCH is restored. The RRC messages discarded may be only on a specific signalling radio bearer or set of signalling radio bearers.

The occurrence of buffered measurement reports is common when there is radio link failure or an RLC unrecoverable error because they are configured to be sent as the radio link deteriorates. Up to 50 measurement reports may be queued in signalling radio bearer queues following a radio link failure or an RLC unrecoverable error, which may take several seconds to be transmitted dependent on the type of radio channels in use.

In some embodiments disclosed herein, only certain types of un-transmitted RRC messages are discarded. One type of un-transmitted RRC message that can be discarded are measurement reports. The measurement reports contain detailed information about the radio environment at the time the report is encoded. The radio environment may change rapidly, therefore reports that are not delivered promptly are out of date and are no longer useful once the DCCH is disabled. The majority of measurement reports may only apply to the CELL DCH state 303 therefore cannot be used by the UTRAN 105 once the UE 102 has entered the CELL FACH state 305. Other procedures apply equally to CELL FACH 305 and CELL DCH 303. In some embodiments, only the measurement report RRC messages could be discarded, while messages from other procedures are maintained.

The measurement reports maybe categorised by type. The type of measurement reports may include intra-frequency cell measurements (performed by the UE when the current and target cell operate on the same carrier frequency), inter-frequency cell measurements (performed by the UE when the neighbour cell operate on a different carrier frequency, compared to the current cell), inter-RAT (radio access technology) cell measurements (i.e. GSM and E-UTRA), traffic volume measurements, quality measurements, and UE internal measurements (i.e. transmit power and received signal strength indicator RSSI).

The $3^{rd}$ Generation Partnership Project (3GPP) specification 3GPP TS 25.215 "Physical Layer; Measurements" defines the measurement quantities that the above types of measurement report may contain. For completeness a brief summary is provided herein.

These measurement quantities may include:
CPICH RSCP—Received Signal Code Power, the received power on one code measured on the Common Pilot Channel (CPICH).
PCCPCH RSCP—Received Signal Code Power, the received power on one code measured on the Primary Common Control Physical Channel (PCCPCH) from a time-division duplexing (TDD) cell.
UTRA carrier RSSI—The received wide band power, including thermal noise and noise generated in the receiver, within the bandwidth defined by the receiver pulse shaping filter.
GSM carrier RSSI—Received Signal Strength Indicator, the wide-band received power within the relevant channel bandwidth.
CPICH Ec/No—The received energy per chip divided by the power density in the band. Measurement shall be performed on the Primary CPICH.
Transport channel BLER—Estimation of the transport channel block error rate (BLER). The BLER estimation shall be based on evaluating the cyclic redundancy check (CRC) of each transport block associated with the measured transport channel after Radio Link (RL) combination. The BLER shall be computed over the measurement period as the ratio between the number of received transport blocks resulting in a CRC error and the number of received transport blocks.
UE transmitted power—The sum of the total UE transmitted power on all configured uplink carriers.
System Frame Number (SFN)—Connection Frame Number (CFN) observed time difference—Handover timing for CELL DCH transitions.
SFN-SFN observed time difference—There are two types of SFN-SFN measurement: Type 1—based on Primary Common Control Physical Channel (P-CCPCH) timing, is used for estimating timing differences for handover in CELL FACH state; Type 2—based on Primary Common Pilot Channel (P-CPICH) timing, is used for estimating UE position for use with location-based services (LBSs).
UE Rx-Tx time difference—The difference in time between the UE uplink Dedicated Physical Control Channel (DPCCH) frame transmission and the first detected path (in time), of the downlink Dedicated Physical Channel (DPCH) or Fractional DPCH (F-DPCH) frame from the measured radio link.
UE transmission power headroom—For each uplink DPCCH, UE transmission power headroom (UPH) is the ratio of the maximum UE transmission power and the DPCCH code power.
E-UTRA RSRP—Reference signal received power (RSRP), is defined as the linear average over the power contributions of the resource elements that carry cell-specific reference signals within the considered measurement frequency bandwidth.
E-UTRA RSRQ—Reference Signal Received Quality (RSRQ) is defined as the ratio N×RSRP/(E-UTRA carrier RSSI), where N is the number of resource blocks of the E-UTRA carrier RSSI measurement bandwidth.

These measurements may be configured to be periodic, with a measurement report sent to the UTRAN 105 every configured time period. Alternatively, the measurement reports may be event based, wherein the UE 102 only sends the measurement report to the UTRAN 105 when the measurement crosses a certain configured level or threshold i.e. when the measurement exceeds or falls below a predetermined level. For example the RSSI of the cell drops below a fixed level, or an offset from another cell.

Further filtering could be applied that result in only certain types of measurement reports being discarded. For example traffic volume measurements can be prevented from being discarded. These are not a direct measurement of the radio environment and therefore apply in CELL FACH 305 state as well.

In some embodiments, Non-Access Stratum (NAS) layer signalling messages should not be discarded. One reason for not discarding NAS messages is that they are used for call setup, and discarding them would cause failures in this process.

RRC messages sent on signalling radio bearers contain a RRC-SN (RRC-sequence number) used for the generation of integrity protection codes (MAC). The RRC-SN is maintained for each signalling radio bearer. When the RRC messages are discarded from a signalling radio bearer queue in the RLC layer 205, appropriate updating of the RRC-SN's of the RRC messages remaining in the signalling radio bearer queues is required. That is, the RRC-SN in a RRC message must be restored to the value consistent with the latest transmitted RRC message on the DCCH. As a result, the RRC-SN used in the first RRC message following restoration of the DCCH following radio link failure or an RLC unrecoverable error will be the same as if the discarded un-transmitted RRC messages were never generated, for each radio bearer.

The RRC-SN and an associated Hyper Frame Number (HFN) are maintained separately for each signalling radio bearer, and separately for each direction of transmission. The RRC-SN has a range 0 to 15, and is incremented by one for every RRC message sent, and included in the RRC message. When the RRC-SN is equal to 15 and an increment is required, an additional counter, the Hyper Frame Number (HFN), is incremented. Thus, the HFN is an overflow counter mechanism used in the UE 102 and node-B 104 in order to limit the actual number of RRC-SN bits that are needed to be sent over the radio link between the UE 102 and UTRAN 105. The HFN is not sent in the RRC messages, it must be calculated by the RNC 106 (the receiving entity that handles RRC peer messages). Both the RRC-SN and HFN must be the same in UE 102 and UTRAN 105 for the integrity protection to succeed and the RRC message to be accepted. The RNC 106 will always set its RRC-SN to the received RRC-SN, and the $3^{rd}$ Generation Partnership Project (3GPP) specifications 3GPP TS 25.331 "Radio Resource Control (RRC); Protocol specification" and TS 33.102 "3G security; Security architecture" allow calculation of HFN if up to 15 control messages are lost in RLC. It is required to restore the RRC-SN and HFN back to the value of the latest transmitted message, otherwise the discard of the un-transmitted RRC messages from the signalling radio bearers would be limited to 15 RRC messages.

In addition to the selected subset of un-transmitted RRC messages being discarded from the signalling radio bearer queues in the RLC layer 205, other RRC messages can be discarded. For example, RRC messages that have been transmitted to the UTRAN 105, and are being held in the queues (awaiting acknowledgement from the UTRAN 105 that the transmitted messages were safely received by the UTRAN 105) are discarded in line with a re-establishment indication in the CELL UPDATE CONFIRM 404. RRC messages that have been partially transmitted to the UTRAN 105 are also discarded in line with a re-establishment indication in the CELL UPDATE CONFIRM 404.

Alternatively or additionally, the step of moderating RRC messages stored in the one or more buffers of the RLC layer 205 at step S610 may comprise restricting the supply of RRC messages sent from the RRC layer 207 to the signalling radio bearer queues in the RLC layer 205.

When the RRC layer 207 is notified of a transmission restriction on DCCH, the RRC layer 207 may not send any RRC messages to the signalling radio bearer queues in the RLC layer 205.

Alternatively, only certain types of RRC messages are restricted from being sent to the signalling radio bearer queues in the RLC layer 205. For example, measurement report RRC messages, which may become out of date while the DCCH transmission is disabled, may be restricted from being sent to the signalling radio bearer queues in the RLC layer 205.

Further filtering could be applied that result in only certain types of measurement reports being restricted from being sent to the signalling radio bearer queues in the RLC layer 205. For example traffic volume measurements can be prevented from being restricted such that the traffic volume measurements are able to be sent to the signalling radio bearer queues in the RLC layer 205. These are not a direct measurement of the radio environment and therefore apply in CELL FACH 305 state as well.

While the DCCH is disabled, due to the time critical nature of the measurement report, it is not desirable to generate many measurement reports that will become out of date in signalling radio bearer queues in the RLC layer 205. The UE 102 may therefore moderate the measurement reports such that only a limited number of periodic reports are generated, while in "DCCH disabled" state. That is, once a predetermined number of periodic measurement reports are generated and sent to the signalling radio bearer queues in the RLC layer 205 no more periodic reports are submitted to the signalling radio bearer queues in the RLC layer 205. This moderation is done in such a way that the most recent measurement reports are sent when the DCCH is re-enabled by lower layers i.e. the physical layer (L1) or link layer (L2). In this way the most recent and useful measurement reports are delivered promptly.

In some embodiments, NAS messages should not be restricted from being sent to the signalling radio bearer queues in the RLC layer 205.

Referring back to the process shown in FIG. 6, following step S610 of moderating RRC messages stored in the one or more buffers of the RLC layer 205 the process proceeds to step S612.

At step S612 the RRC layer 207 determines whether an error recovery procedure is required or not. The determination at step S612 includes determining whether the DCCH is still disabled following the initial determination that the DCCH was disabled at step S606.

In one scenario, the DCCH can be disabled due to low Q value in the physical layer 201 (determined at step S606). However the low Q value may recover in the physical layer 201 (L1) such that the DCCH is disabled only temporarily. Thus the DCCH may be re-enabled without further involvement by the RRC layer 207. This is only an example, there are other instances where the physical layer (L1) or link layer (L2) disable the DCCH for a short period of time and then restart it without RRC involvement. These instances include but are not limited to power limiting in transport format combination (TFC) selection or E-TFC (E-DCH Transport Format Combination) selection, or no E-DCH serving grant. If the DCCH has recovered (the DCCH is not disabled), an error recovery procedure is not required and the process proceeds to step S608 where the RRC messages stored in the signalling radio bearer queues in the RLC layer 205 are transmitted on the DCCH from the UE 102 to the UTRAN 105. The RRC layer 205 now stops moderating the transmission of messages, and returns to normal operation. For instance all measurement reports are transmitted normally and without restriction in embodiments disclosed herein.

If it is determined at step S612 that the DCCH is still disabled, the process proceeds to step S614 where an error recovery procedure is initiated. In one scenario, the DCCH can be disabled due to a low Q value in the physical layer 201 (determined at step S606). If the low Q value persists the physical layer 201 (L1) will raise a radio link failure error to the RRC layer 207. The RRC layer 207 then begins an error recovery procedure (for example the procedure shown in FIG. 4).

Once the DCCH is enabled following completion of the error recovery procedure (at step S614), the process proceeds to step S608 where the RRC messages stored in the signalling radio bearer queues in the RLC layer 205 are transmitted on the DCCH from the UE 102 to the UTRAN 105.

Figure 4:
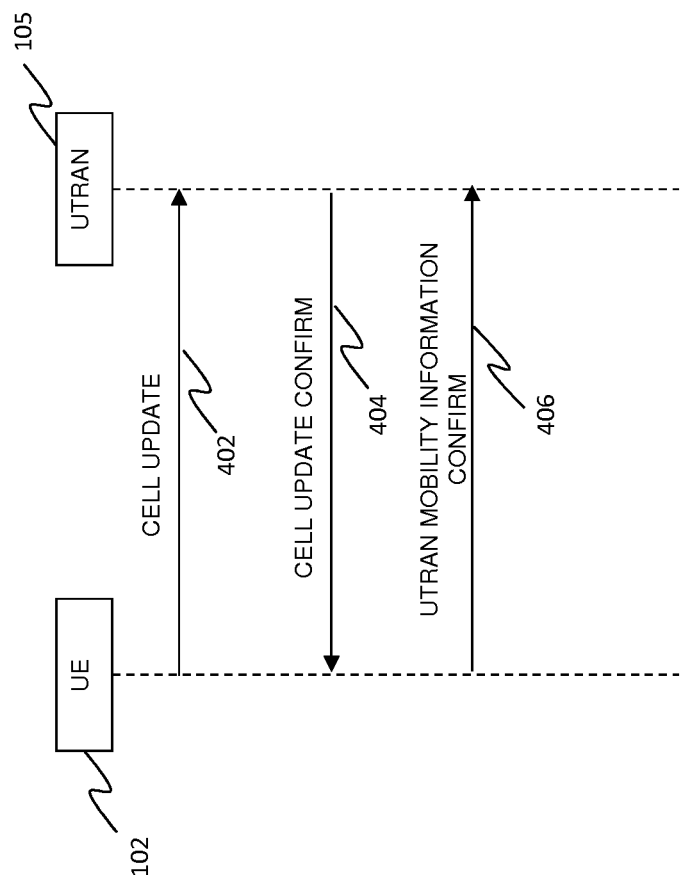
FIG. 4 shows a recovery procedure.

The step of moderating RRC messages stored in the one or more buffers of the RLC layer 205 removes the delay experienced in the procedures shown in FIG. 4 to enable the DCCH. That is, the step of moderating the RRC messages removes the delay the RRC messages cause to respond to the CELL UPDATE CONFIRM 404 (i.e. the delay to transmit the UTRAN MOBILITY INFORMATION CONFIRM 406) in the procedure of FIG. 4. The reduction of the delay to restart data transmission has several different effects, which include, but are not limited to the following:

The UTRAN 105 receives the response (i.e. UTRAN MOBILITY INFORMATION CONFIRM 406) to CELL UPDATE CONFIRM 404 in a timely manner and determines the radio link failure recovery has succeeded. The radio connection is maintained, avoiding the need to perform a new connection setup which would delay user data transmission some seconds.

The response to CELL UPDATE CONFIRM 404 (i.e. UTRAN MOBILITY INFORMATION CONFIRM 406) may be transmitted as soon as possible, so user data transmission can start without delay.

The reduction of the number of RRC messages buffered in the RLC layer 205 has benefits when the radio link recovers before the RRC layer 207 begins error recovery procedure S614. Once layer 2 or layer 1 restore transmission, up to date RRC messages will be transmitted earlier. This makes the radio resource control procedures more robust, for instance measurement reports received in the network will not be out of date, and the network can send correct radio link control configuration information.

The disclosure has been described with reference to a radio link failure scenario in UTRAN and an RLC unrecoverable error scenario in UTRAN. However the embodiments disclosed herein can apply to other error recovery scenarios in other radio access technologies.

Those skilled in the art will appreciate that restoration of the DCCH may involve mapping the DCCH onto the same transport channel that was used prior to the DCCH being disabled or mapping the DCCH onto a different transport channel that was used prior to the DCCH being disabled.

While the disclosure illustrates and describes embodiments, it will be understood to those skilled in the art that various changes in form and detail may be made without departing from the scope of the disclosure as defined by the below claims.

The invention claimed is:

1. A method for handling error recovery at a user equipment, the method comprising:
   maintaining a first communication channel and a second communication channel between the user equipment and a radio access network;
   storing a plurality of control messages in one or more buffers for transmission over the first communication channel;
   detecting if the first communication channel is disabled;
   initiating a recovery procedure using the second communication channel, wherein the recovery procedure comprises restoring the first communication channel using the second communication channel;
   sending a further message to one of the one or more buffers for transmission on the restored first communication channel as part of said procedure; and
   in response to detecting that the first communication channel is disabled, moderating control messages stored in the one or more buffers by one or both of:
   selecting a subset of un-transmitted control messages from a plurality of un-transmitted control messages in the one or more buffers, and discarding said subset of un-transmitted control messages from the one or more buffers, wherein the step of discarding is implemented upon initiating the recovery procedure or during the recovery procedure; and
   restricting the supply of control messages to the one or more buffers.

2. The method according to claim 1, wherein said subset comprises one or more measurement report messages, each of said one or more measurement report messages comprising a measurement of the user equipment's radio environment.

3. The method according to claim 2, wherein said measurement report messages includes one or more of the following types:
   intra-frequency cell measurements;
   inter-frequency cell measurements;
   inter-radio access technology cell measurements;
   traffic volume measurements;
   quality measurements; and
   user equipment internal measurements.

4. The method according to claim 2, wherein the measurement of the user equipment's radio environment is one or more of the following quantities:
   a received signal power;
   a received signal strength;
   a transmitted signal power;
   a transmitted signal strength; and
   a timing difference between data elements communicated between the user equipment and the radio access network.

5. The method according to claim 2, wherein at least one of the one or more measurement report messages is generated periodically for transmission to the radio access network.

6. The method according to claim 2, wherein at least one of the one or more measurement report messages is event based, whereby the measurement report message is generated for transmission to the radio access network when the measurement exceeds or falls below a predetermined level.

7. The method according to claim 2, wherein the method further comprises filtering said subset of un-transmitted control messages based on type of measurement report message and discarding the filtered subset of un-transmitted control messages from the one or more buffers.

8. The method according to claim 7, wherein said filtering prevents measurement report messages comprising a traffic volume measurement from being discarded.

9. The method according to claim 1, the method further comprising:
   modifying a sequence number included in an un transmitted control message remaining in the one or more buffers responsive to said step of discarding such that the sequence number is consistent with a sequence number included in the last control message to be transmitted on the first communication channel prior to the first communication channel being disabled.

10. The method according to claim 9, wherein the sequence number is a radio resource control sequence number (RRC-SN).

11. The method according to claim 1, wherein un-transmitted Non-Access Stratum messages are not discarded from the one or more buffers.

12. The method according to claim 1, wherein the step of restricting the supply of control messages comprises restricting all control messages such that no control messages are supplied to the one or more buffers.

13. The method according to claim 1, wherein the step of restricting the supply of control messages comprises restricting the supply of a subset of control messages to the one or more buffers.

14. The method according to claim 13, wherein said subset comprises one or more measurement report messages, each of the one or more measurement report messages comprising a measurement of the user equipment's radio environment.

15. The method according to claim 14, wherein said measurement report messages includes one of the following types:

an intra-frequency cell measurement;
an inter-frequency cell measurement;
an inter-radio access technology cell measurement;
a traffic volume measurement;
a quality measurement; and
a user equipment internal measurement.

16. The method according to claim 14, wherein the measurement of the user equipment's radio environment is one or more of the following quantities:
a received signal power;
a received signal strength;
a transmitted signal power;
a transmitted signal strength; and
a timing difference between data elements communicated between the user equipment and the radio access network.

17. The method according to claim 14, wherein at least one of the one or more measurement report messages is generated periodically for transmission to the radio access network.

18. The method according to claim 17, wherein a predetermined number of periodic measurement reports are permitted to be supplied to the one or more buffers, and any additional periodic measurement reports are restricted from being supplied to the one or more buffers.

19. The method according to claim 14, wherein at least one of the one or more measurement report messages is event based, whereby the measurement report message is generated for transmission to the radio access network when the measurement exceeds or falls below a predetermined level.

20. The method according to claim 14, wherein the method further comprises filtering said subset of control messages based on type of measurement report message and restricting the supply of the filtered subset of control messages to the one or more buffers.

21. The method according to claim 20, wherein said filtering prevents measurement report messages comprising a traffic volume measurement from being restricted.

22. The method according to claim 13, wherein un-transmitted Non-Access Stratum messages are not restricted from being supplied to the one or more buffers.

23. The method according claim 1, wherein user equipment communicates with the radio access network in accordance with a multi-layered communication protocol, wherein the one or more buffers are in a radio link control layer and the control messages are supplied from a radio resource control layer to the one or more buffers in the radio link control layer.

24. The method according to claim 1, wherein the first communication channel is a dedicated control channel and the second communication channel is a common control channel.

25. The method according to claim 1, wherein the control messages are radio resource control messages.

26. The method according to claim 1, wherein in response to detecting that the first communication channel is disabled, the method comprises moderating control messages stored in the one or more buffers by selecting a subset of un-transmitted control messages from a plurality of un-transmitted control messages in the one or more buffers, and discarding said subset of un-transmitted control messages from the one or more buffers.

27. The method according to claim 1, wherein in response to detecting that the first communication channel is disabled, the method comprises moderating control messages stored in the one or more buffers by restricting the supply of control messages to the one or more buffers.

28. A user equipment comprising:
a central processing unit;
a memory coupled to the central processing unit, the memory containing program code executable by the central processing unit causing the central processing unit to perform the following steps:
maintaining a first communication channel and a second communication channel between the user equipment and a radio access network;
storing a plurality of control messages in one or more buffers for transmission over the first communication channel;
detecting if the first communication channel is disabled;
initiating a recovery procedure using the second communication channel, wherein the recovery procedure comprises restoring the first communication channel using the second communication channel;
sending a further message to one of the one or more buffers for transmission on the restored first communication channel as part of said procedure; and
in response to detecting that the first communication channel is disabled, moderating control messages stored in the one or more buffers by one or both of:
selecting a subset of un-transmitted control messages from a plurality of un-transmitted control messages in the one or more buffers, and discarding said subset of un-transmitted control messages from the one or more buffers, wherein the step of discarding is implemented upon initiating the recovery procedure or during the recovery procedure; and
restricting the supply of control messages to the one or more buffers.

29. A computer program product for handling error recovery at a user equipment, the computer program product comprising code embodied on a non-transient computer-readable medium and configured so as when executed on a processing apparatus of the user equipment to perform the following steps:
maintaining a first communication channel and a second communication channel between the user equipment and a radio access network;
storing a plurality of control messages in one or more buffers for transmission over the first communication channel;
detecting if the first communication channel is disabled;
initiating a recovery procedure using the second communication channel, wherein the recovery procedure comprises restoring the first communication channel using the second communication channel;
sending a further message to one of the one or more buffers for transmission on the restored first communication channel as part of said procedure; and
in response to detecting that the first communication channel is disabled, moderating control messages stored in the one or more buffers by one or both of:
selecting a subset of un-transmitted control messages from a plurality of un-transmitted control messages in the one or more buffers, and discarding said subset of un-transmitted control messages from the one or more buffers, wherein the step of discarding is implemented upon initiating the recovery procedure or during the recovery procedure; and
restricting the supply of control messages to the one or more buffers.

* * * * *